United States Patent
Rao et al.

(10) Patent No.: US 6,419,620 B1
(45) Date of Patent: Jul. 16, 2002

(54) PROCESS FOR THE PRODUCTION OF A FLY ASH SLURRY

(75) Inventors: Sukuru Ramakrishna Rao; Swapan Kumar Ghosh; Sibendra Kumar Basu; Barun Kumar Mall; Shreekant Verma; Gulab Singh; Satinath Mazumdar, all of Dhanbad (IN)

(73) Assignee: Coouncil of Scientific and Industrial Research, New Delhi (IN)

( * ) Notice: Subject to any disclaimer, the term of this patent is extended or adjusted under 35 U.S.C. 154(b) by 0 days.

(21) Appl. No.: 09/820,196

(22) Filed: Mar. 28, 2001

(51) Int. Cl.[7] ................................. A62D 3/00
(52) U.S. Cl. ....................... 588/256; 106/708
(58) Field of Search ................ 106/708, 287.24; 588/256, 257, 250

(56) References Cited

U.S. PATENT DOCUMENTS

| | | |
|---|---|---|
| 1,840,710 A | 1/1932 | Goddard |
| 4,302,251 A * | 11/1981 | Udagawa et al. ............ 106/708 |
| 4,618,376 A | 10/1986 | Saternus et al. ............... 134/26 |
| 5,043,077 A | 8/1991 | Chandler et al. ............ 210/698 |
| 5,173,117 A | 12/1992 | Inokawa et al. ............. 106/823 |
| 5,630,785 A * | 5/1997 | Pridemore et al. ........... 588/256 |
| 5,649,895 A * | 7/1997 | Fix et al. ...................... 588/256 |
| 5,928,128 A * | 7/1999 | Steketee et al. ............. 588/256 |

FOREIGN PATENT DOCUMENTS

| | | |
|---|---|---|
| GB | 184880 | 8/1922 |
| GB | 746774 | 3/1956 |
| JP | 62192491 | 8/1987 |
| JP | 62192492 | 8/1987 |

OTHER PUBLICATIONS

Patent Abstract of Japan Publication No. 62192492 dated Aug. 24, 1987.
Patent Abstract of Japan Publication No. 62192491 dated Aug. 24, 1987.

* cited by examiner

Primary Examiner—Heather Shackelford
Assistant Examiner—John Kreck
(74) Attorney, Agent, or Firm—Ladas & Parry

(57) ABSTRACT

The present invention describes an improved method for forming fly ash slurry by mixing fly ash and water with an additive containing 0.5–2 wt % ammonium salt of humic acid and 0.03 to 0.05 wt % tannin extract. The product slurry does not require large amount of water for transport to storage space due to its enhanced viscosity and stability.

3 Claims, No Drawings

PROCESS FOR THE PRODUCTION OF A FLY ASH SLURRY

FIELD OF THE INVENTION

The present invention relates to a process for the production of fly ash slurry.

BACKGROUND OF THE INVENTION

Fly ash is a primary product of coal utilisation and is obtained as a fine particulate mineral residue, left behind after all combustibles in coal are burnt out. The current output rate of fly ash from stream raising and other plants utilising pulverised coal is about 10 metric tons per annum. The accumulation without adequate avenues for consumption or disposal otherwise creates a problem of storage space. Air polluted by boiler chimneys or carried away by prevailing winds from open heaps also causes lung disorders such as breathing problems for human beings. There is a pressing need felt by planners and operators of power stations to discover new areas of usage of fly ash such that the twin problems of storage and pollution can be mitigated. The absence of a workable solution has resulted in the stockpiling of fly ash.

Prior art methods for the preparation of an ash suspension comprises directing dry ash from under dust collecting equipment to flushing apparatus of different types or to ejectors, which are supplied with water at the weight ratio of several times greater that of the ash weight. A large volume of water is required to reduce the surface tension of ash in order to achieve full moisturisation thereof and, thus a suspension. The suspension of a low concentration is sedimental because it does not have the characteristics of heavy liquid. It is subsequently fed along with a portion of the slag directly to drag pumps which force it through to the storage yard by pipelines the hydrotransport apparatus conveying said suspension requires a large volume of water which is obtained by recycling the water from the storage yard by return pipelines.

U.S. Pat. No. 4,618,376 discloses a method of continuous production of fly ash in water of a suspension a high concentration of ash with the subsequent addition of slag or granular ash and an installation for the application of this method. The production process is divided in subsequent stages and is realised in separate zones of a flow mixer. Ash, slag, water and granular ash are fed in a continuous manner. However, this process suffers from the drawback that the process is divided into several zones: moisturisation zone, homogenisation zone, and fluidisation zone and the stability of the product is not adequate.

OBJECTS OF THE INVENTION

The main object of the invention is to provide a process for the production of fly ash slurry, which overcomes the drawbacks of the prior art enumerated above.

Another object of the invention is to provide a process for the production of fly ash slurry with high concentration of fly ash ans which overcomes the problems relating to viscosity, stability and concentration in the prior art methods.

SUMMARY OF THE INVENTION

Accordingly the present invention provides a process for the production of fly ash slurry said process comprising mixing fly ash and water with an additive containing 0.5–2 wt % ammonium salt of humic acid and 0.03 to 0.05 wt % tannin extract at a temperature in the range of 35 to 50° C. for a time period in the range of 30 to 45 minutes and discharging at ambient temperature to obtain the fly ash slurry.

In one embodiment of the invention, the viscosity of the fly ash slurry is in the range of 310 to 340 mPs at 128 sec$^{-1}$.

In another embodiment of the invention, the process is a one step process.

The invention also relates to a composition for use as an additive in the production of fly ash comprising 0.5–2 wt % ammonium salt of humic acid and 0.03 to 0.05 wt % tannin extract.

The mixture of the invention is a synergistic admixture with properties over and above the aggregate properties of the individual ingredients.

DETAILED DESCRIPTION OF THE INVENTION

The process of the invention involves the addition of a mixture of ammonium salt of humic acid and tannin extract to fly ash and water to form a mixture to obtain a slurry with high concentration of fly ash and with enhanced stability and viscosity.

Thus the fly ash slurry can easily be pumped in view of the reduction in the sedimental nature thereof. This reduces the amount of water required in prior art processes to pump fly ash to the storage yard.

The process of the invention is explained hereinbelow with reference to the examples which are illustrative and should not be construed as limiting the scope of the invention.

EXAMPLE 1

54 g of fly ash, 45 g of water and an additive system consisting of 1 wt % ammonium salt of humic acid and 0.05 wt % of tannin extract are subjected to mixing in a mixer with an agitating device at a temperature of 40° C. for 35 minutes. Agitation was maintained at 140 ppm. The product was discharged at ambient temperature. The viscosity of the product was found to be 330 mPs at 128 sec$^{-1}$.

EXAMPLE 2

54 g of fly ash, 45 g of water and an additive system consisting of 1.5 wt % ammonium salt of humic acid and 0.05 wt % of tannin extract are subjected to mixing in a mixer with an agitating device at a temperature of 45° C. for 35 minutes. Agitation was maintained at 140 rpm. The product was discharged at ambient temperature. The viscosity of the product was found to be 338 mPs at 128 sec$^{-1}$.

EXAMPLE 3

54 g of fly ash, 45 g of water and an additive system consisting of 0.8 wt % ammonium salt of humic acid and 0.05 wt % of tannin extract are subjected to mixing in a mixer with an agitating device at a temperature of 35° C. for 40 minutes. Agitation was maintained at 140 ppm. The product was discharged at ambient temperature. The viscosity of the product was found to be 327 mPs at 128 sec$^{-1}$.

ADVANTAGES OF THE INVENTION

1. The process is carried out in one step, which overcomes the multiplicity of steps in the prior art processes.
2. The stability of the fly ash slurry obtained is high enabling easy pumpability.

We claim:

1. A process for the production of fly ash slurry said process comprising mixing fly ash and water with an additive containing 0.5–2 wt % ammonium salt of humic acid and 0.03 to 0.05 wt % tannin extract at a temperature in the range of 35 to 50° C. for a time period in the range of 30 to 45 minutes and discharging at ambient temperature to obtain the fly ash slurry.

2. A process as claimed in claim 1 wherein the viscosity of the fly ash slurry is in the range of 310 to 340 mPs at 128 $sec^{-1}$.

3. A process as claimed in claim 1 wherein the process is a one step process.

* * * * *